United States Patent
Bourion et al.

(10) Patent No.: US 11,795,856 B2
(45) Date of Patent: Oct. 24, 2023

(54) EXHAUST GAS PURIFICATION DEVICE WITH IMPROVED AIR INLET NOZZLE

(71) Applicant: FAURECIA SYSTEMES D'ECHAPPEMENT, Nanterre (FR)

(72) Inventors: Bjorn Bourion, Voujeaucourt (FR); Thibault Waltzer, Bavans (FR); Morgane Guldner, Montbeliard (FR)

(73) Assignee: FAURECIA SYSTEMES D'ECHAPPEMENT

(*) Notice: Subject to any disclaimer, the term of this patent is extended or adjusted under 35 U.S.C. 154(b) by 0 days.

(21) Appl. No.: 17/978,277

(22) Filed: Nov. 1, 2022

(65) Prior Publication Data
US 2023/0138976 A1    May 4, 2023

(30) Foreign Application Priority Data
Nov. 3, 2021   (FR) ...................... 21 11668

(51) Int. Cl.
  *F01N 3/30*  (2006.01)
  *F01N 3/20*  (2006.01)
  *B01D 53/94* (2006.01)

(52) U.S. Cl.
  CPC ............... *F01N 3/30* (2013.01); *B01D 53/94* (2013.01); *F01N 3/2013* (2013.01); *F01N 2470/04* (2013.01)

(58) Field of Classification Search
  CPC ....... F01N 3/30; F01N 3/2013; F01N 2240/16
  USPC ............................................. 60/289
  See application file for complete search history.

(56) References Cited

U.S. PATENT DOCUMENTS

| | | | |
|---|---|---|---|
| 2008/0022907 A1* | 1/2008 | Varner | F23J 3/00 423/239.1 |
| 2009/0165878 A1 | 7/2009 | Krakowski et al. | |

FOREIGN PATENT DOCUMENTS

| DE | 102018108592 A1 | 10/2019 | |
| DE | 102019134859 A1 * | 6/2021 | |
| FR | 3107304 A1 * | 8/2021 | ........... F01N 3/2013 |
| FR | 3109606 B1 | 4/2022 | |

OTHER PUBLICATIONS

Otto, V. E., Held, W., Donnerstag, A., Küper, P. F., Pfalzgraf, B., & Wirth, A. (Feb. 1, 1995). The system development of electrically heated catalyst (EHC) for the Lev and EU-III legislation. SAE International. https://www.sae.org/publications/technical-papers/content/951072/.
French Search Report for Application No. 21 11668 dated May 31, 2022.

* cited by examiner

*Primary Examiner* — Ngoc T Nguyen
(74) *Attorney, Agent, or Firm* — Carlson, Gaskey & Olds, P.C.

(57) ABSTRACT

An end-piece is intended to equip an air inlet nozzle for an exhaust gas purification device, in particular for an internal combustion engine. The end-piece comprises a lateral wall with a general shape of revolution, and at least a first air outlet port provided in the lateral wall.

10 Claims, 3 Drawing Sheets

EXHAUST GAS PURIFICATION DEVICE WITH IMPROVED AIR INLET NOZZLE

CROSS-REFERENCE TO RELATED APPLICATIONS

This application is a U.S. non-provisional application claiming the benefit of French Application No. 21 11668, filed on Nov. 3, 2021, which is incorporated herein by reference in its entirety.

TECHNICAL FIELD

The present disclosure relates to the field of exhaust gas purification devices, in particular for an internal combustion engine. Such a purification device is intended for being arranged in the exhaust line of the internal combustion engine.

BACKGROUND

The internal combustion engine is e.g. fitted to a vehicle, in particular a motor vehicle, a public transport vehicle or a freight transport vehicle, a marine vehicle, or any other conceivable vehicle. The internal combustion engine can also equip a fixed installation.

Exhaust lines of vehicles equipped with internal combustion engines usually include catalytic purification components, e.g. for converting $NO_x$, CO and hydrocarbons into $N_2$, $CO_2$ and $H_2O$. Such components are generally effective only when the catalytic material is at a temperature above a predefined temperature threshold.

To this end, purification devices have been developed comprising a heating element mounted opposite the upstream face of a purification component, so as to accelerate the heating of the purification component when the vehicle is started.

Thus, an exhaust gas purification device is already known from the prior art, in particular for an internal combustion engine, which includes a casing extending along a longitudinal direction, a purification component housed in the casing, and a heating element arranged near the purification component.

In order to improve such a purification device, it is known how to arrange an air inlet nozzle opening into the casing, blowing air into the casing, in particular in order to avoid overheating of the heating element.

SUMMARY

The subject disclosure provides an improved purification device.

To this end, the subject matter of the disclosure is in particular a purification device for exhaust gases, in particular for an internal combustion engine, comprising a casing wherein an exhaust gas is intended to flow, a purification component housed in the casing, a heating element arranged in the vicinity of the purification component, and an air inlet nozzle opening into the casing. The air inlet nozzle is equipped with an end-piece, the end-piece including a lateral wall with a general shape of revolution, and at least a first air outlet port being formed in the lateral wall.

The end-piece, arranged at the end of an air inlet nozzle, is used for diffusing the air so as to spray the heating element as homogeneously as possible. In this way it is possible both to cool the heating element, and also to diffuse the heat from the heating element toward the purification component in the most homogeneous way possible. Due to the homogeneous diffusion, the purification component does not have any overheated point. As a result, the lifetime of the purification component is increased. Moreover, such homogeneous diffusion makes it possible to increase the maximum acceptable power of the heating element. Thus, the above advantageously results in a reduced catalysis initiation time.

The end-piece according to the disclosure can further include one or a plurality of the following features, taken individually or according to all technically conceivable combinations.

The end-piece has a bottom wall, provided at a distal end of the end-piece.

The end-piece has at least one second air outlet port provided in the bottom wall.

Every second air outlet port of the bottom wall is chosen from: an air outlet port delimited by a straight edge and a curved edge, the ends of which are connected to the ends of the straight edge, and/or an air outlet defined by two parallel long, curved edges, connected at the ends thereof by two short edges, and/or a circular air outlet.

The lateral wall of the end-piece has a generally frusto-conical shape on at least a lower part of this end-piece.

The end-piece has an upper part and a lower part separated by a collar.

The lateral wall of the end-piece has, in the lower part, an inner surface with a general shape of revolution about an axis, the collar extending in a plane forming a non-right angle with respect to the axis.

The end-piece comprises, in the upper part, an air inlet opening, and a duct widening from the air inlet opening to the lower part.

The end-piece comprises an air inlet opening, an air inlet cross-section, every air outlet opening having an air outlet cross-section, such that the sum of the surface areas of the air outlet cross-sections is comprised between 20% and 200% of the surface area of the air inlet cross-section, preferentially greater than 100%.

The air inlet nozzle is oriented toward the heating element.

The purification device has only one air inlet nozzle.

BRIEF DESCRIPTION OF THE DRAWINGS

Different aspects and advantages of the disclosure will appear upon reading the following description, given only as an example, and making reference to the annexed figures, amongst which.

DETAILED DESCRIPTION

Figure 1:
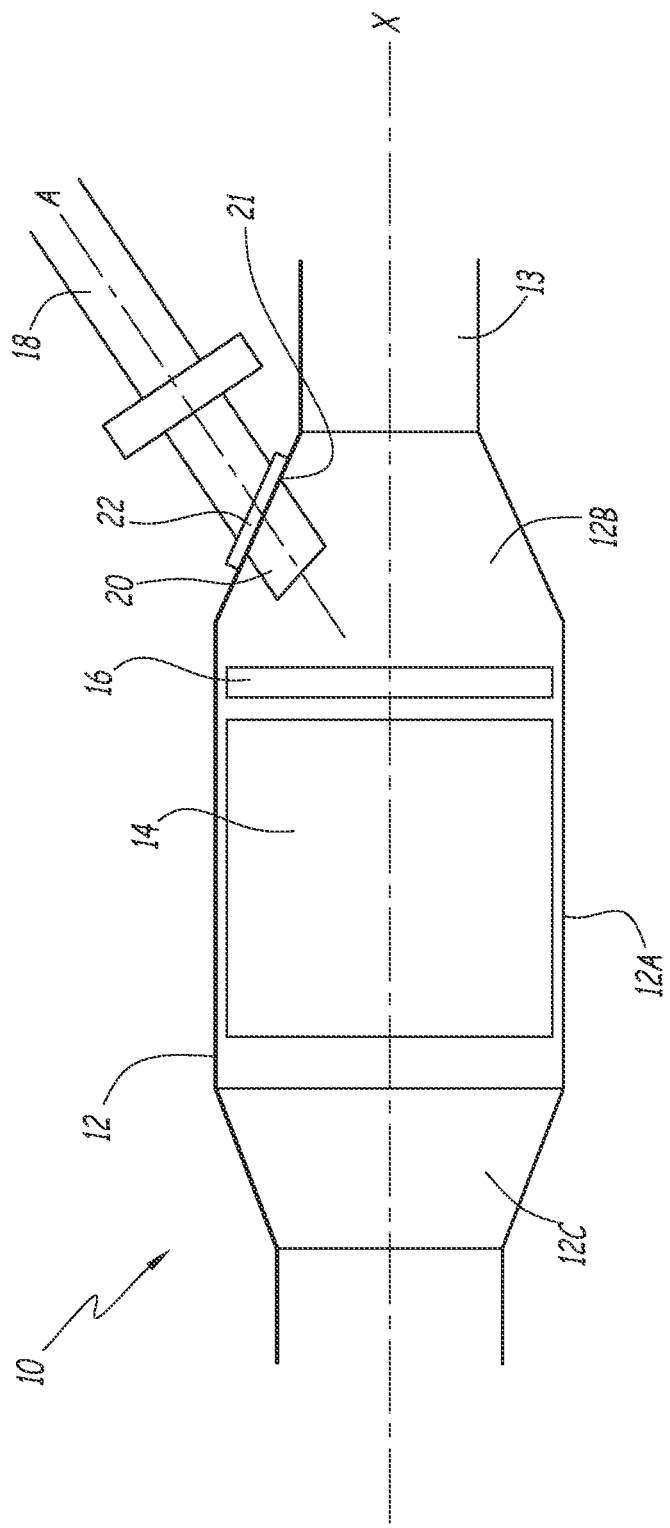
FIG. 1 is a schematic view of a purification system according to an example of embodiment of the disclosure.

FIG. 1 shows a purification device 10 according to an example of embodiment of the disclosure, intended for equipping an exhaust line of an internal combustion engine.

The purification device 10 is arranged in the exhaust line between an upstream section and a downstream section. The terms "upstream" and "downstream" are considered depending on the direction of flow of the exhaust gases in the exhaust line.

The purification device 10 includes a casing 12 extending along a longitudinal direction X and delimiting a housing. In one example, the casing 12 is made of a metallic material.

The casing 12 includes a central part 12A, an inlet part 12B, and an outlet part 12C.

The inlet part 12B closes the housing on the upstream side, and the outlet part 12C closes the housing on the downstream side.

The inlet part 12B has a shape widening from an inlet pipe 13 of the upstream section to as far as the central part 12A. The inlet part 12B has a shape, e.g. a general frustoconical shape, or any shape which widens.

The purification device 10 includes a purification component 14 housed in the casing 12 so that the exhaust gases circulating in the casing 12 flow through the purification component 14. The purification device 14 is an exhaust gas after-treatment component, e.g. a three-way catalyst, a diesel oxidation catalyst, an SCR catalyst, or is of any other suitable type. The purification component 14 preferentially has a general shape of revolution about an axis parallel to the longitudinal direction X.

Conventionally, the purification device 10 includes a heating device, comprising a heating element 16, arranged close to the purification device 14, preferentially upstream of the purification component 14.

The heating element 16 is housed in the casing 12. The heating element 16 is intended for preheating the purification device, in particular at the ignition of the engine or before the ignition.

Advantageously, the heating element 16 has a general shape of revolution defined about an axis parallel to the longitudinal direction X.

The heating element 16 is permeable to gas and, in particular, intended for letting through gases flowing along the longitudinal direction X (in particular exhaust gases, and air as will be subsequently described), so that the gases are heated when flowing through the heating element 16.

Preferentially, the heating element 16 comprises a metal grid. In a variant, the heating element 16 can be made of a metal foam, or by any other suitable heating element, such as a honeycomb body. More particularly, the heating element 16 can be any resistive element suitable for transforming an electric current into heat.

The heating element 16 extends over the entire passage section of the casing 12, so that the gases flowing through the casing 12 necessarily flow across the heating element 16. The gases are thus heated uniformly.

Conventionally, the heating element 16 includes at least one, preferentially two electric terminals, through which the heating element 16 is intended to be electrically powered. For this purpose, each of these electric terminals is intended for being connected to a respective electrode.

The purification device 10 according to the disclosure includes at least one air injection nozzle 18 intended for injecting air into the housing. Preferentially the purification device 10 includes only one injection nozzle 18.

The air blown through the injection nozzle 18 makes it possible in particular to diffuse heat energy during the preheating of the purification component 14 by the heating element 16.

Advantageously, the injection nozzle 18 is arranged for running through the inlet part 12B of the casing 12.

The injection nozzle 18 is oriented along the direction of the heating element 16, i.e. the air flow injected through the injection nozzle 18 has a component, along the longitudinal axis X, oriented along the same direction as the direction of flow of an exhaust gas through the casing 12, from upstream to downstream. The fact that the nozzle 18 is oriented so as to blow air in the same direction as the exhaust gas flow makes it possible to reduce the impact of the air flow on the circulation of the exhaust gas, and not to generate back pressure nor thermomechanical stresses on the nozzle 18. This situation occurs in particular for the passive phases of the heating element 16, i.e. when the engine is in normal operation, and is all the more true for the phases of full engine load. The purpose of such orientation is to minimize the deviation (masking) of the flow generated by the motor on the heating element 16 as well as on the purification component 14.

The injection nozzle 18 includes an end-piece 20 intended for optimizing the diffusion of air toward the heating element 16.

Figure 2:
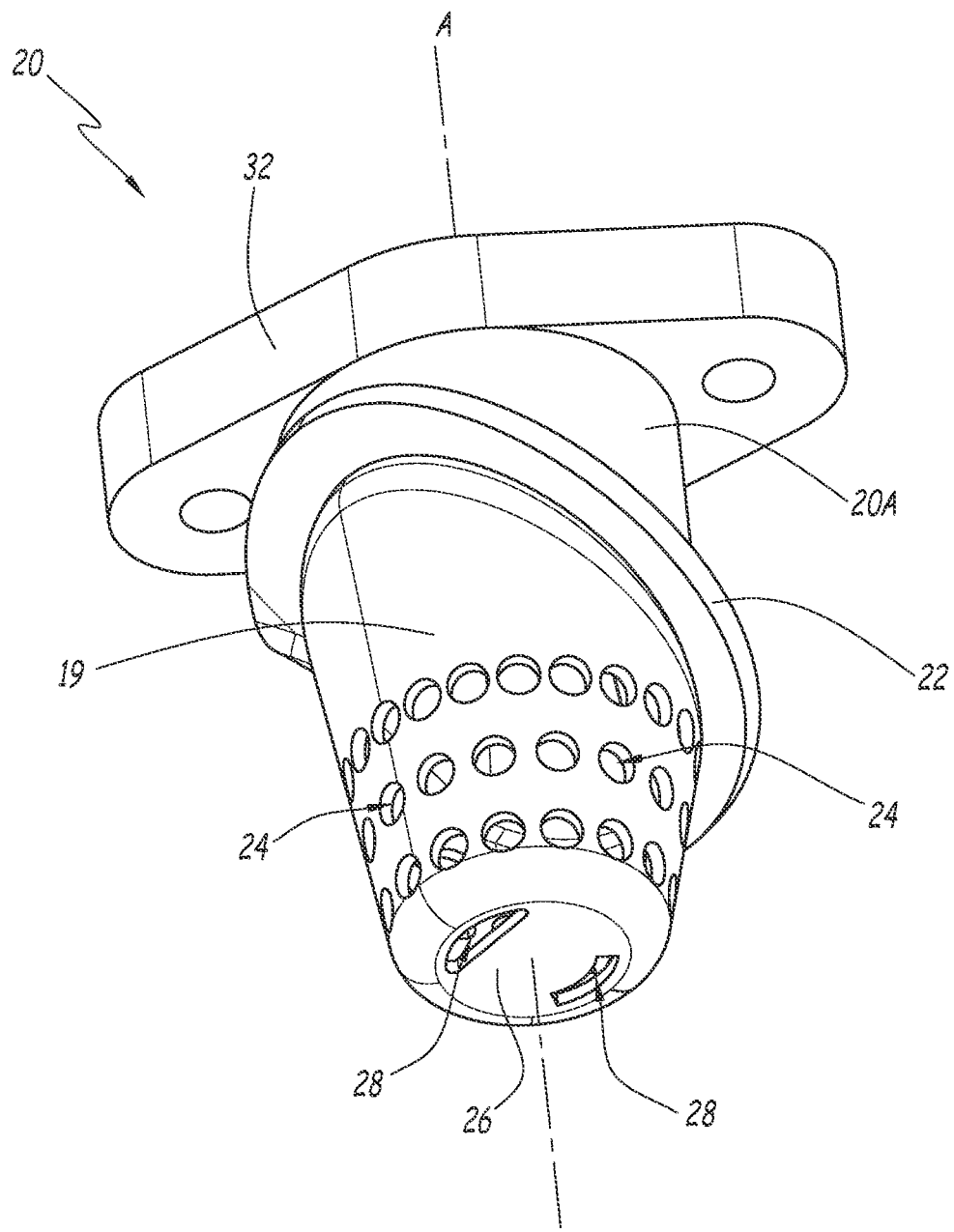
FIG. 2 is a perspective view of an end-piece of an air injection nozzle of the purification device shown in FIG. 1.
Figure 3:
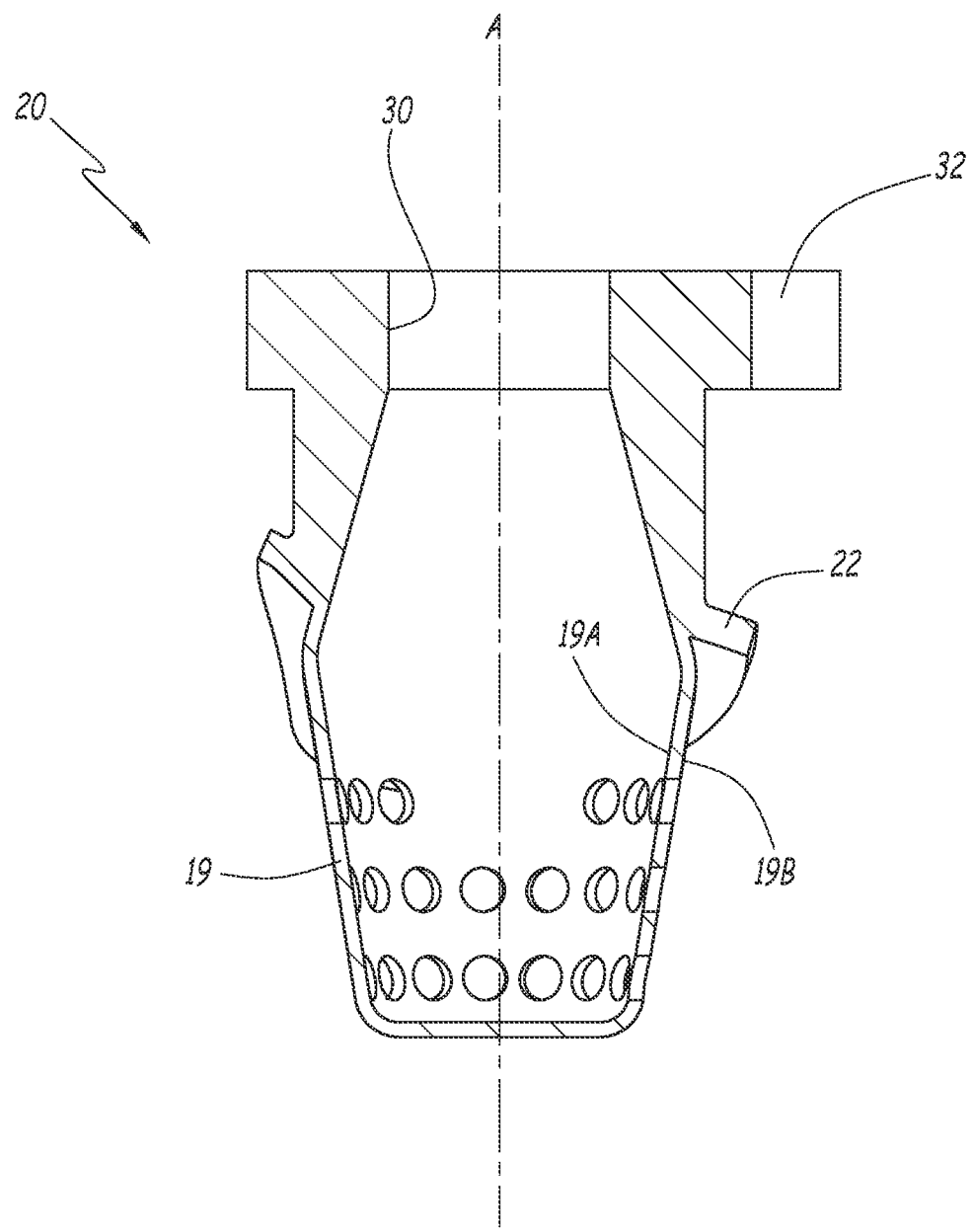
FIG. 3 is an axial section view of the end-piece shown in FIG. 2.

The end-piece 20, shown in greater detail in FIGS. 2 and 3, includes a lateral wall 19 with a general shape of revolution.

The end-piece 20 extends along an axis A. In the example described, the lateral wall 19 has a general shape of revolution about the axis A.

The end-piece 20 includes an upper part 20A, intended for being arranged outside the casing 12, and a lower part 20B, intended for extending inside the casing 12. Thus, the end-piece 20 runs through an opening 21 provided in the inlet part 12B.

Advantageously, the end-piece 20 includes a collar 22 separating the upper 20A and lower 20B parts. The collar 22 is intended to abut against the edge of the opening 21. The collar 22 provides the joining by welding of the end-piece 20 onto the inlet part 12B, preventing the projection of welding particles inside the purification device.

The collar 22 is preferentially inclined with respect to the axis A, i.e. the collar extends in a plane forming a non-right angle with the axis A. The inclination of the collar 22 thus imposes the orientation of the end-piece 20 inside the casing 12, i.e. the orientation of the lower part 20B. A person skilled in the art designing the end-piece 20 would easily be able to choose the inclination of the collar 22 according to the desired orientation for the lower part 20B.

More particularly, in the lower part 20B, the lateral wall 19 has an inner surface 19A and an outer surface 19B. In the example described, the inner surface 19A and the outer surface 19B are concentric, both having a general shape of revolution defined about the axis A. However, in a variant, only the inner surface 19A has a general shape of revolution defined about the axis A, the shape of the outer surface 19B being less important for the diffusion of air.

In a preferred embodiment, the end-piece 20 is oriented toward a central part of the heating element 16. The axis A passes e.g. through the center of the heating element 16.

The axis A forms with the longitudinal axis X an angle within a range, e.g. between 0 and 75°, preferentially between 5 and 60°, and further preferentially between 10 and 45°.

As shown in FIGS. 2 and 3, the end-piece 20 includes, in the lower part 20B thereof, at least one air outlet port.

More particularly, the lateral wall 19 includes, in the lower part 20B, at least one air outlet port, and preferentially a plurality of air outlet ports, called first air outlet ports 24.

In the example described, each first air outlet port 24 has a circular shape. However, in a variant, the first air outlet ports 24 could have other possible shapes, e.g. oblong, rectangular, triangular or other. Moreover, the first air outlet ports 24 do not necessarily all have the same shape.

Advantageously, the first air outlet ports 24 are distributed circumferentially throughout the entire periphery of the lateral wall 19. Thus, air is injected, through the air outlet ports 24, in all directions, which allows the air to arrive substantially homogeneously onto the heating element 16.

Preferentially, the first air outlet ports 24 are aligned circumferentially, in a plurality of rows superposed along the direction of the axis A, e.g., in the example described, in three rows.

In every row e.g. the distance between two adjacent first air outlet ports 24 is less than the diameter of each of the two first air outlet ports 24.

According to the embodiment described, the lateral wall 19 has, at least in the lower part 20B, a general frustoconical shape. Thus, the first air outlet ports 24 are oriented along a direction forming a non-right angle with the axis A.

It should be noted that the angle of a cone formed by the frustoconical shape is preferentially less than 80°.

It is thus possible to envisage an extra flat cone with an angle of 80° with respect to the axis A. In such case, the axis of the first outlet ports 24 is 10° with respect to axis A.

According to a variant (not shown), the lower part 20B could be cylindrical, in which case the axis of the first outlet ports 24 is 90° with respect to the axis A.

Advantageously, the end-piece 20 includes in addition, a bottom wall 26, provided at a distal end of the end-piece 20.

In the embodiment described, the end-piece 20 comprises at least one air outlet port formed in said bottom wall 26, called the second air outlet port 28. In a variant, the bottom wall 26 cannot include a port.

In the example described, the bottom wall 26 includes two second air outlet ports 28, preferentially arranged radially close to an outer edge of the bottom wall 26.

One of the second air outlet ports 28 is, for example, bounded by a straight edge and a curved edge the ends of which are connected to the ends of the straight edge.

One of the second air outlet ports 28 is, for example, delimited by two parallel long, curved edges, connected at the ends thereof by two short edges.

It is also possible to provide the second air outlet ports 28 with other forms, e.g. with a circular, rectangular, triangular, oblong edge, or any conceivable form.

It should be noted that the end-piece 20 includes an air inlet opening 30, visible in FIG. 3, connected to the nozzle 18. The air inlet opening 30 has an air inlet cross-section, and each air outlet opening 24, 28 has its own air outlet cross-section, such that the sum of the surface areas of the air outlet cross-sections is comprised between 20% and 200% of the surface area of the air inlet cross-section.

Preferentially, the sum of the surface areas of the air outlet cross-sections is greater than the surface area of the air inlet cross-section. Thus, the end-piece 20 does not imply a back pressure resisting the flow of injected air.

Advantageously, in the upper part 20A, the end-piece 20 has an internal duct widening from the air inlet opening 30 to as far as the lower part 20B.

Preferentially, the end-piece 20 includes a flange 32 for fastening the end-piece 20 to the nozzle 18.

It should be noted that the end-piece 20 is, for example, manufactured by the following manufacturing method.

The manufacturing method includes the production of the flange 32 and of a tube.

The method then includes the deformation of the tube, so as to form the collar 22.

The tube is also preferentially deformed, in the lower part thereof, so as to form the lower part 20B with a shape, e.g. in the form with a frustoconical shape.

The method then includes the drilling of the first air outlet ports 24.

Finally, the method includes the joining of the flange 32 with the tube, for forming the end-piece 20. The joining is performed, for example, by welding.

It should be noted that the method advantageously includes the production of the bottom wall 26, preferentially comprising the second outlet port or ports 28, and the joining of the bottom wall 26 with the tube at the end thereof by welding, for example.

The end-piece 20 thus formed is directly mounted onto the purification device 10, more particularly in the opening 21 of the inlet part 12B, so that the collar 22 rests against the edge of the opening 21. The collar 22 is then preferentially welded to said edge of the opening 21. The collar 22 provides the joining by welding of the end-piece 20 on the inlet part 12B, preventing the projection of welding particles inside the purification device.

In a variant, the end-piece 20 could be produced by casting, or any other conceivable method.

It appears that the end-piece 20 according to the disclosure can be used for diffusing the air homogeneously toward the heating element 16. The air arriving in the end-piece 20 is distributed between the plurality of outlet ports, which creates turbulence in the air flow and makes it possible to obtain a good homogeneity and a good velocity of the air on the heating element 16.

It should be noted that the disclosure is not limited to the embodiment described above, but could have various supplementary variants.

The invention claimed is:

1. A purification device for exhaust gases, comprising:
a casing wherein an exhaust gas is intended to flow;
a purification component housed in the casing;
a heating element arranged close to the purification component;
an air inlet nozzle opening into the casing, wherein the air inlet nozzle is equipped with an end-piece, the end-piece including a lateral wall with a general shape of revolution, wherein the end-piece extends along an axis about which the lateral wall is revolved to form the general shape of revolution, and at least one first air outlet port being provided in the lateral wall; and
wherein the end-piece has a bottom wall provided at a distal end of the end-piece, and wherein the end-piece has at least one second air outlet port provided in the bottom wall.

2. The purification device according to claim 1, wherein the end-piece has an upper portion and a lower portion separated by a collar.

3. The purification device according to claim 2, wherein the lateral wall of the end-piece has, in the lower portion, an inner surface with the general shape of revolution about the axis, the collar extending in a plane at a non-right angle with respect to the axis.

4. The purification device according to claim 2, wherein the end-piece comprises, in the upper portion, an air inlet opening, and a duct widening from the air inlet opening to as far as the lower portion.

5. The purification device according to claim 1, wherein the air inlet nozzle includes an air inlet opening having an air inlet cross-section, each first air outlet port having an air outlet cross-section, such that a sum of surface areas of the air outlet cross-sections is comprised between 20% and 200% of a surface area of the air inlet cross-section.

6. The purification device according to claim 5, wherein the sum of the surface areas of the air outlet cross-sections is greater than 100% of the surface area of the air inlet cross-section.

7. The purification device according to claim 1, wherein the air inlet nozzle is oriented toward the heating element.

8. The purification device according to claim 1, wherein the air inlet nozzle comprises only one air inlet nozzle.

9. A purification device for exhaust gases, comprising:
a casing wherein an exhaust gas is intended to flow;
a purification component housed in the casing;
a heating element arranged close to the purification component; and
an air inlet nozzle opening into the casing, wherein the air inlet nozzle is equipped with an end-piece, the end-piece including a lateral wall with a general shape of revolution, wherein the end-piece extends along an axis about which the lateral wall is revolved to form the general shape of revolution, and at least one first air outlet port being provided in the lateral wall, wherein the end-piece has a bottom wall provided at a distal end of the end-piece, and wherein the end-piece has at least one second air outlet port provided in the bottom wall, and wherein each second air outlet port of the bottom wall is selected from:

an air outlet port delimited by a straight edge and a curved edge with ends that are connected to ends of the straight edge; and/or an air outlet delimited by two parallel long edges connected at ends thereof by two short edges; and/or a circular air outlet port.

10. A purification device for exhaust gases, comprising:
a casing wherein an exhaust gas is intended to flow;
a purification component housed in the casing;
a heating element arranged close to the purification component; and
an air inlet nozzle opening into the casing, wherein the air inlet nozzle is equipped with an end-piece, the end-piece including a lateral wall with a general shape of revolution, wherein the end-piece extends along an axis about which the lateral wall is revolved to form the general shape of revolution, and at least one first air outlet port being provided in the lateral wall, and wherein the lateral wall of the end-piece has a general frustoconical shape on at least a lower portion of the end-piece.

* * * * *